United States Patent
Ruckart (10) Patent No.: US 7,136,670 B1
(45) Date of Patent: Nov. 14, 2006

(54) MOBILE COMMUNICATION DEVICE WITH AUDIO RECORDER

(75) Inventor: John P. Ruckart, Atlanta, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 402 days.

(21) Appl. No.: 10/092,452

(22) Filed: Mar. 7, 2002

(51) Int. Cl.
  H04M 1/00 (2006.01)
  H04M 1/64 (2006.01)
  H04M 9/08 (2006.01)

(52) U.S. Cl. .............. 455/556.1; 455/556.2; 455/412.1; 379/67.1; 379/387.01; 379/419

(58) Field of Classification Search ............ 455/556.1, 455/556.2, 463, 464, 412.1; 379/67.1, 387.01, 379/419
See application file for complete search history.

(56) References Cited

U.S. PATENT DOCUMENTS

| | | | |
|---|---|---|---|
| 4,481,382 A * | 11/1984 | Villa-Real ................. 455/556.1 |
| 5,247,700 A * | 9/1993 | Wohl et al. ............... 455/552.1 |
| 5,647,002 A | 7/1997 | Brunson |
| 5,675,333 A * | 10/1997 | Boursier et al. ............. 341/87 |
| 5,815,800 A * | 9/1998 | Su et al. .................... 340/7.22 |
| 5,867,793 A * | 2/1999 | Davis ........................ 455/556.1 |
| 5,872,926 A | 2/1999 | Levac et al. |
| 5,898,916 A | 4/1999 | Breslawsky |
| 5,951,638 A | 9/1999 | Hoss et al. |
| 5,970,387 A * | 10/1999 | Yuan ........................... 340/7.28 |
| 6,035,352 A * | 3/2000 | Alonso et al. .............. 710/100 |
| 6,038,199 A | 3/2000 | Pawlowski et al. |
| 6,138,036 A | 10/2000 | O'Cinneide |
| 6,157,827 A | 12/2000 | Fujiwara |
| 6,202,050 B1 * | 3/2001 | Chen ........................... 704/275 |
| 6,233,318 B1 | 5/2001 | Picard et al. |
| 6,233,320 B1 | 5/2001 | Haimi-Cohen |
| 6,240,302 B1 | 5/2001 | Harrison |
| 6,266,674 B1 * | 7/2001 | Hejna, Jr. ................... 379/67.1 |
| 6,301,245 B1 | 10/2001 | Luzeski et al. |
| 6,321,129 B1 | 11/2001 | D'Agosto, III |
| 6,510,208 B1 * | 1/2003 | Komiya .................... 455/412.1 |
| 6,532,375 B1 * | 3/2003 | Cathey et al. .............. 455/574 |
| 6,690,417 B1 * | 2/2004 | Yoshida et al. ........... 455/556.1 |

FOREIGN PATENT DOCUMENTS

WO    WO 94/20951    * 9/1994

OTHER PUBLICATIONS

"The All New Sanyo SCP 4700 IS Here" printed from www.freecellphoneguy.com/sanyo_4700_promo.htm on Apr. 3, 2002.
"Cellular Phones—Special Features" printed from www.cellular—phones.com/cellular-phones-3.html on Apr. 3, 2002.
Targus—Essential Accessories for Mobile Computing Travel, Tech, Tips and Talkback, vol. 1, Issue 19, Oct. 18, 2001.

* cited by examiner

*Primary Examiner*—Quochien B. Vuong
*Assistant Examiner*—Wen Huang
(74) *Attorney, Agent, or Firm*—Thomas, Kayden, Horstemeyer & Risley LLP (57) ABSTRACT

A mobile communication device that has self-contained audio recorder and playback circuitry therein.

16 Claims, 7 Drawing Sheets

MOBILE COMMUNICATION DEVICE WITH AUDIO RECORDER

BACKGROUND OF THE INVENTION

1. Field of the Invention

The subject invention relates to mobile communication devices and, more particularly, to a mobile communication device that has means for recording and playing back audio messages.

2. Description of the Invention Background

Mobile communication devices, such as wireless and cellular telephones, personal digital assistants ("PDA's"), pagers, etc. are becoming increasing popular and indispensable work tools for many individuals. Likewise, portable sound recording devices which enable the user to record an audio memorandum and play it back at a later time have also become popular. However, to have both capabilities, a user must typically carry two separate devices. It is desirable and convenient to have a mobile communication device that also has the ability to record and play back audio messages without having to carry two separate devices.

U.S. Pat. No. 6,233,320 to Haimi-Cohen discloses a method and apparatus for recording and playing back conversations using a digital wireless phone.

U.S. Pat. No. 6,240,302 to Harrison discloses a wireless phone with removable personal information manager.

U.S. Pat. No. 6,321,129 discloses enhanced user control operations for portable digital audio recorders.

SUMMARY OF THE INVENTION

In accordance with one embodiment of the present invention, there is provided a mobile communication device comprising a housing and a mobile telephone operably supported by the housing. A self-contained audio recorder is operably supported by the housing.

Another embodiment of the present invention comprises a mobile communication device that includes a housing the operably supports a mobile pager and a self-contained audio recorder.

Accordingly, the various embodiments of the present invention represent unique and novel mobile communication devices and methods. Those of ordinary skill in the art will readily appreciate, however, that these and other details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE EMBODIMENTS OF THE INVENTION

Referring now to the drawings for the purposes of illustrating the present preferred embodiments of the invention only and not for the purposes of limiting the same, it is to be understood that standard components or features that are within the purview of an artisan of ordinary skill and do not contribute to the understanding of the various embodiments of the invention are omitted from the drawings to enhance clarity. The various embodiments of the present invention are directed to mobile communication devices that have the ability to record and play back an audio message. As used herein, the term "mobile communication device" encompasses wireless and cellular telephones, PDA's (i.e., palm pilots, handspring devices), single and multiple way pagers, etc.

Figure 1:
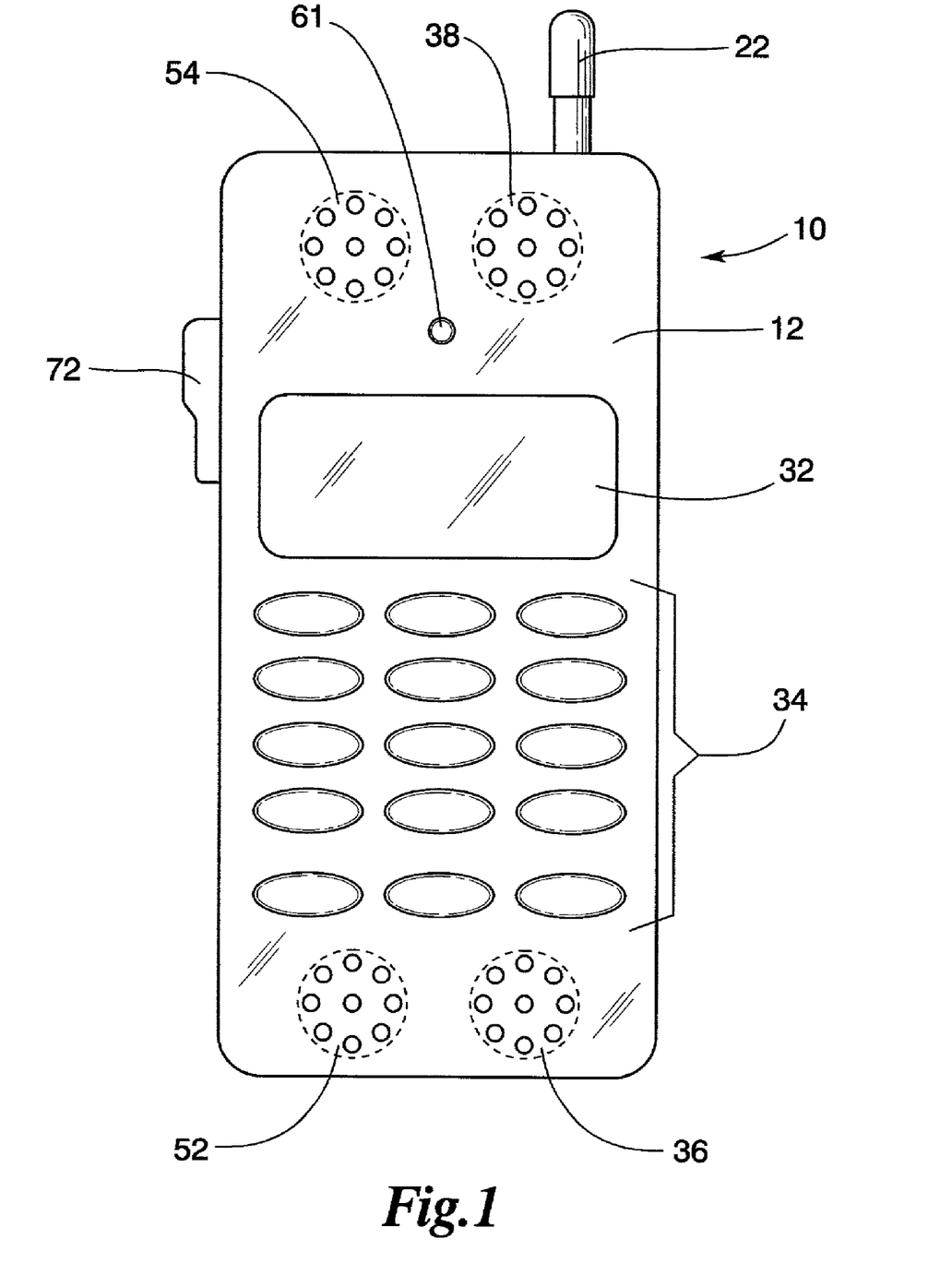
FIG. 1 is a front view of one embodiment of a mobile communication device of the present invention.
Figure 2:
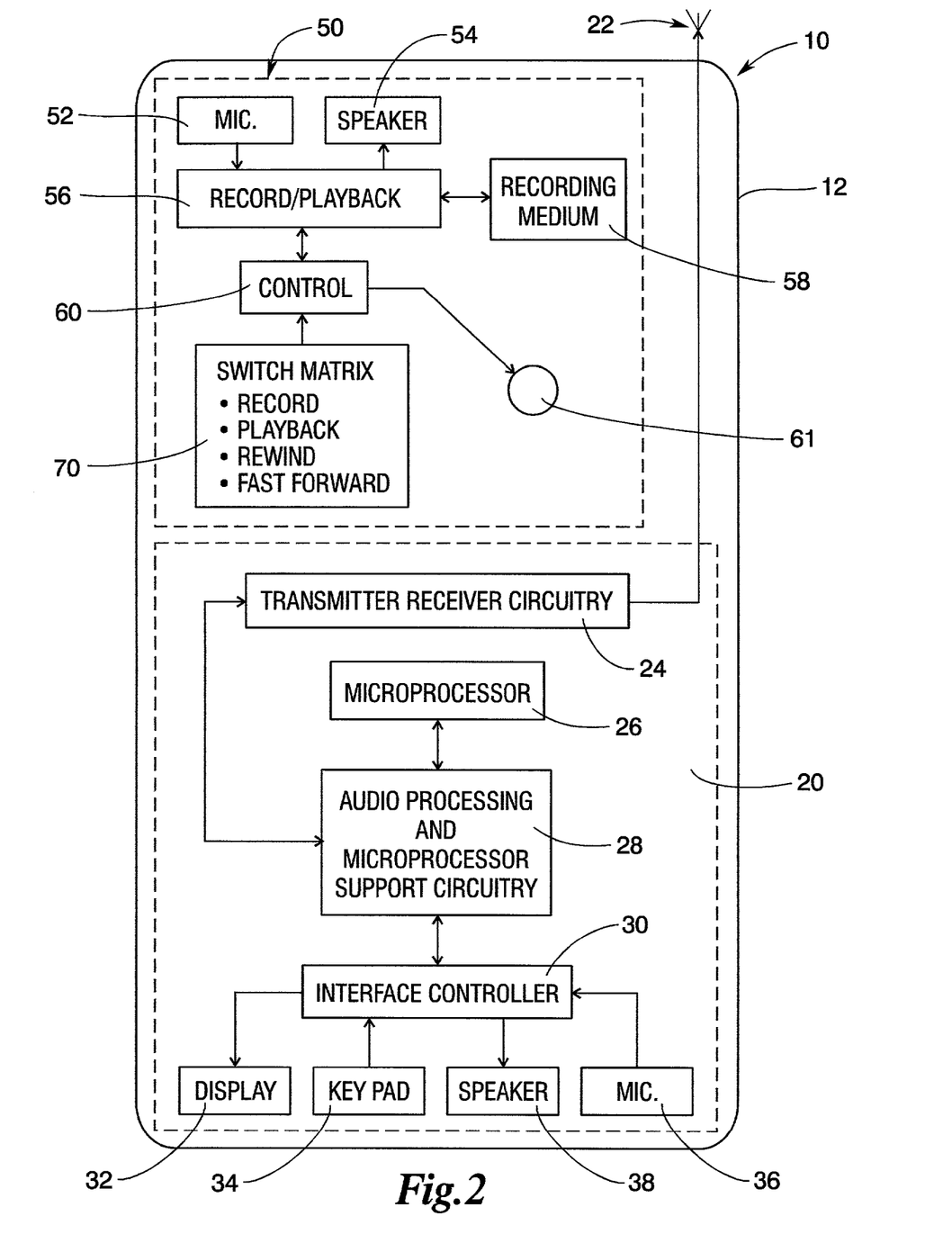
FIG. 2 is a partial schematic depicting certain components of the mobile communication device of FIG. 1.

FIGS. 1 and 2 disclose one embodiment of a mobile communication device 10 of the present invention. As can be seen in those Figures, device 10 includes a housing 12 that houses a wireless telephone 20 and a "self-contained" audio recorder 50. As used herein, the term "self-contained" means that the recorder 50 includes all of the components necessary to at least record and playback audio messages without interfacing with any other components or systems located apart from the device 10. Other functions such as the ability to fast forward skip messages, etc. may also be included.

Those of ordinary skill in the art will appreciate that the components forming telephone 20 can comprise virtually any collection of mobile (i.e., wireless, cellular, etc.) telephone components. Thus, the telephone portion 20 of the device 10 can be either analog or digital without departing from the spirit or scope of the various embodiments of the present invention.

FIGS. 1 and 2 illustrate a telephone 20 of one embodiment of the present invention. In this embodiment, the telephone 20 may include an antenna 22, conventional transmitter receiver circuitry 24, a conventional microprocessor 26, conventional audio processing and microprocessor support circuitry 28, a conventional interface controller 30, a conventional alphanumeric display 32, a keypad 34, a "first" microphone 36 and a "first" speaker 38 and any other conventional components necessary for the telephone to interface with conventional mobile telecommunication systems. The operation of such components and interaction therebetween will be understood by those of ordinary skill in the art and therefore will not be discussed in great detail herein.

This embodiment of the present invention also includes an audio recorder 50 which may include components set forth in FIG. 2. As can be seen in that Figure, audio recorder 50 may be "self-contained" and include a "second" microphone 52 and a "second" speaker 54. A record/playback circuit 56 receives electrical sound signals generated at the microphone 52 and records such signals on a recording medium 58. The recording medium 58 may comprise, for example, a conventional solid state memory card or magnetic tape cassette. If digital recording is to be carried out in the recorder 50, the record/playback circuit 56 may include analog-to-digital conversion circuitry. If that is the case, the record/playback circuit 56 may include data compression/decompression circuitry. The record/playback circuit 56 may serve to reproduce a stored sound signal from the recording medium and to process the reproduced signal to provide an output signal to the speaker.

A control circuit 60 may be employed to exchange signals with the record/playback circuit 56. The control circuit 60 controls the record/playback circuit 56 of the recorder 50 in general. In this embodiment, the control circuit 60 may comprise a "second" microprocessor (not shown) or microcontroller (not shown). It will be understood that such controller device may include program memory and working memory, which are also not separately shown. If desired, an LED 61 may be employed to indicate when the recorder is in record mode.

In this embodiment, the recorder 50 also includes at least one switch matrix 70 which enables the user to provide input to the control circuit 20. Such collection switch matrix 70 may include one or more keys 72 for commencing and discontinuing various functions such as record, playback, rewind and fast forward functions. The skilled artisan will appreciate, however, that some of the above-mentioned switches/keys may be omitted or replaced with other switches/keys. Furthermore, the keys 72 may each operate a respective switch 70 which is movable between a first position (nonactuated) and a second position (actuated). In one embodiment, for example, some or all of the switches are biased toward their respective nonactuated positions. In another embodiment, one or more of the switches may be actuated by a shared key configuration, such as a rocker switch. A variety of known switching arrangements and configurations may be employed. For example, one arrangement that may be employed requires the user to actively maintain the record switch in the activated position to record an audio message onto the recording medium. In another "record lock" mode, recording is carried out without requiring the user to maintain the record switch in the activated position.

Those of ordinary skill in the art will understand that the mobile communication device 10 may also include other components not specifically shown, such as a power manager which controls the supply of power and ground potential to the various components and circuits of the mobile telephone 20 and the audio recorder 50 such that separate types of power and grounding may be available for digital circuits, analog and audio circuits, and RF circuits. A rechargeable battery (not shown) may be included in the device 10 which supplies portable power to the wireless telephone 20 and the audio recorder 50 and is rechargeable through a known charge control circuit. In addition, a charging connector (not shown) may also be included for receiving charging current from a charging accessory, such as, for example, a wall or table mounted transformer. The mobile communication device 10 can be used as a standard mobile telephone and, when desired, the user can activate the audio recorder 50 to take notes, record a message, etc. to be played back at a later time.

Figure 3:
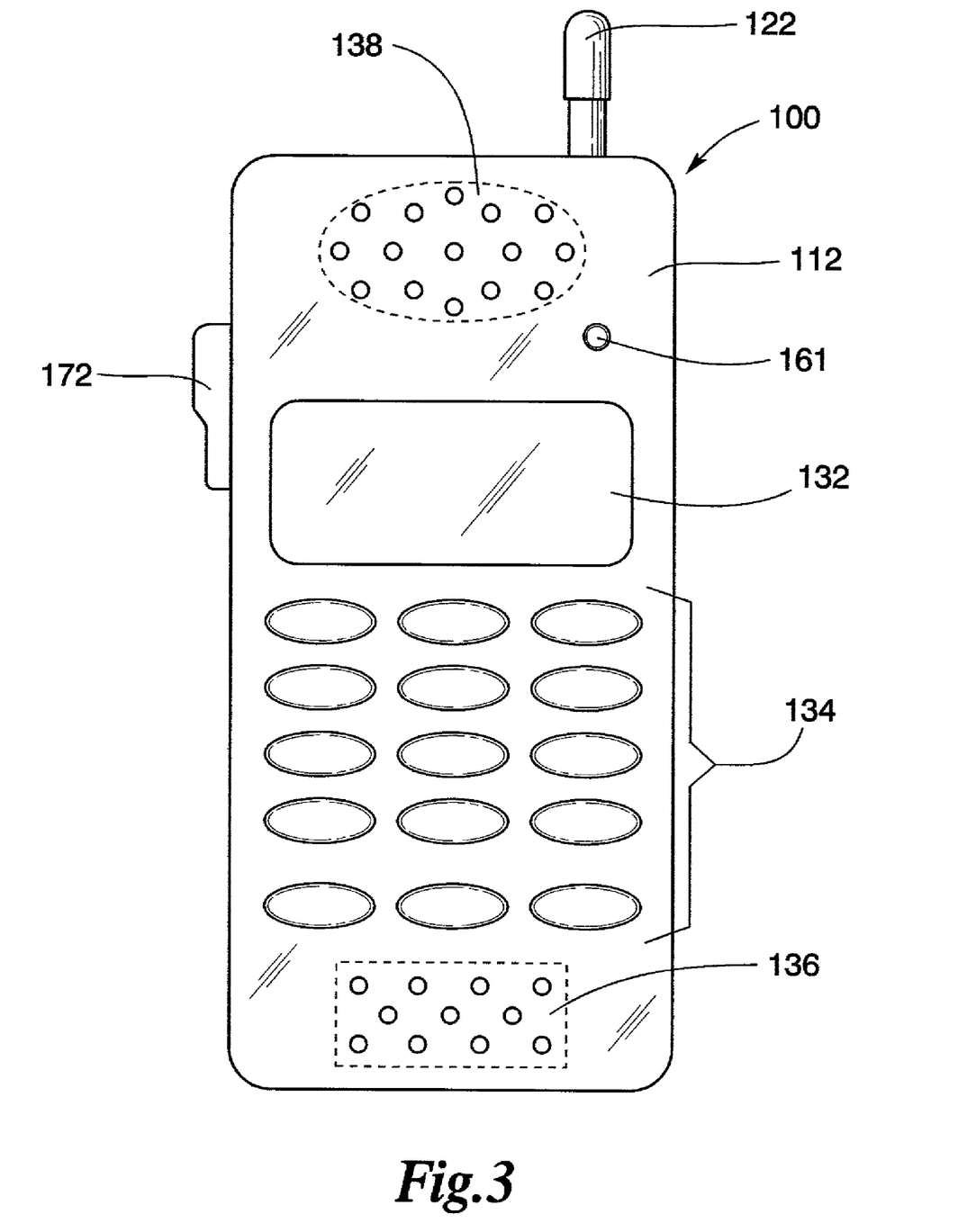
FIG. 3 is a front view of another embodiment of a mobile communication device of the present invention.
Figure 4:
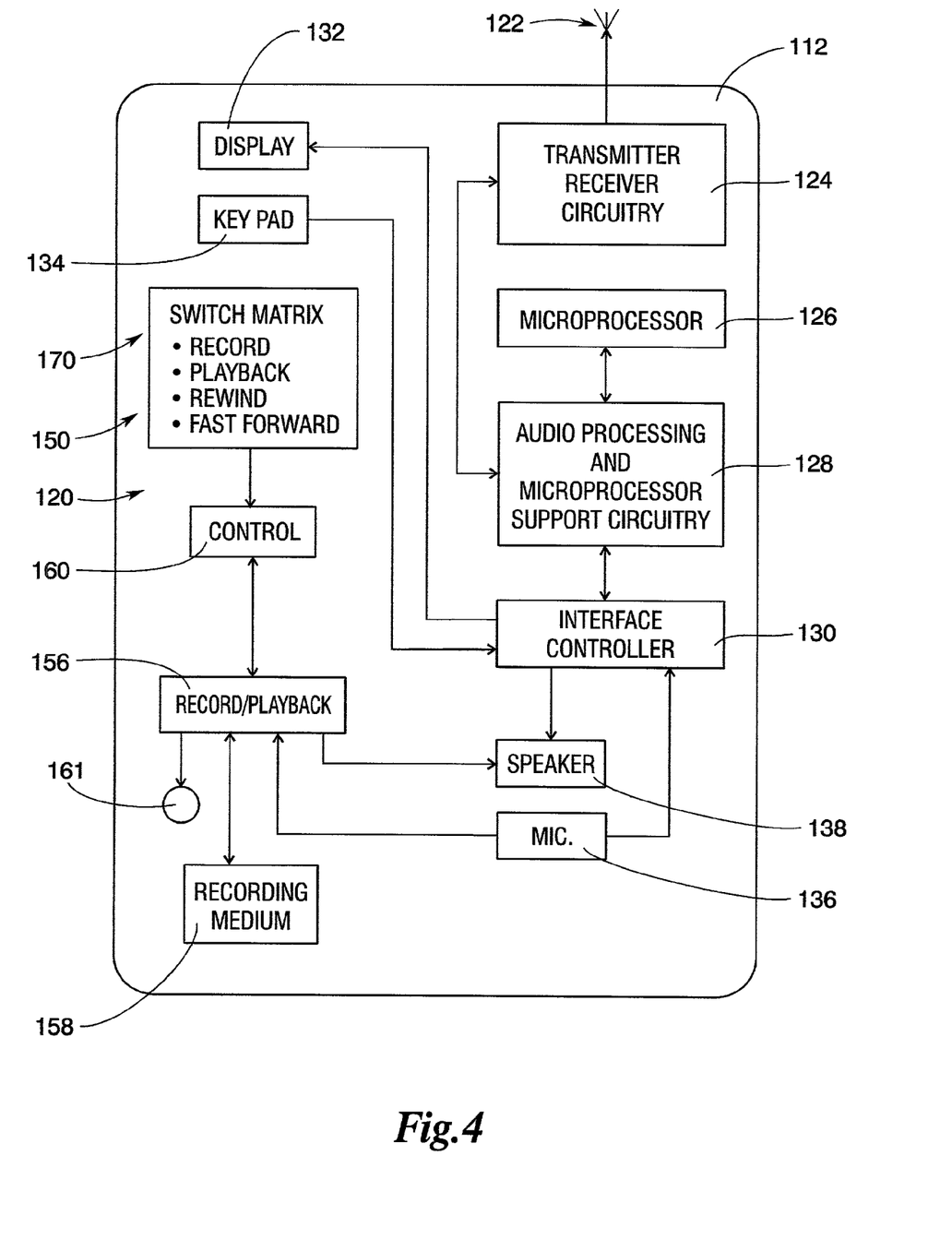
FIG. 4 is a partial schematic depicting certain components of the mobile communication device of FIG. 3.

Another embodiment of the mobile communication device of the present invention is depicted in FIGS. 3 and 4. In this embodiment, the mobile communication device 100 includes a mobile telephone 120 and an audio recorder 150 that share certain components as will be described in further detail below. Device 100 includes a housing 112 that supports the components of the mobile telephone 120 and the audio recorder 150 therein. In this embodiment, the device 100 may include an antenna 122, conventional transmitter receiver circuitry 124, a conventional microprocessor 126, conventional audio processing and microprocessor support circuitry 128, a conventional interface controller 130, a conventional alphanumeric display 132, a keypad 134, a microphone 136 and a speaker 138 and any other conventional components necessary for the telephone to interface with conventional mobile telecommunication systems.

The audio recorder 150 portion of the device 100 maybe "self-contained" and include a record/playback circuit 156 for receiving electrical sound signals generated at the microphone 136 and recording such signals on a recording medium 158. The recording medium 158 may comprise, for example, a conventional solid state memory card or magnetic tape cassette. If digital recording is to be carried out, the record/playback circuit 156 may include analog-to-digital conversion circuitry. If that is the case, the record/playback circuit 156 may include data compression/decompression circuitry. The record/playback circuit 156 may reproduce a stored sound signal from the recording medium and to process the reproduced signal to provide an output signal to the speaker 138. Thus, in this embodiment, the telephone 120 and the audio recorder 150 share a microphone and a speaker.

Figure 4A:
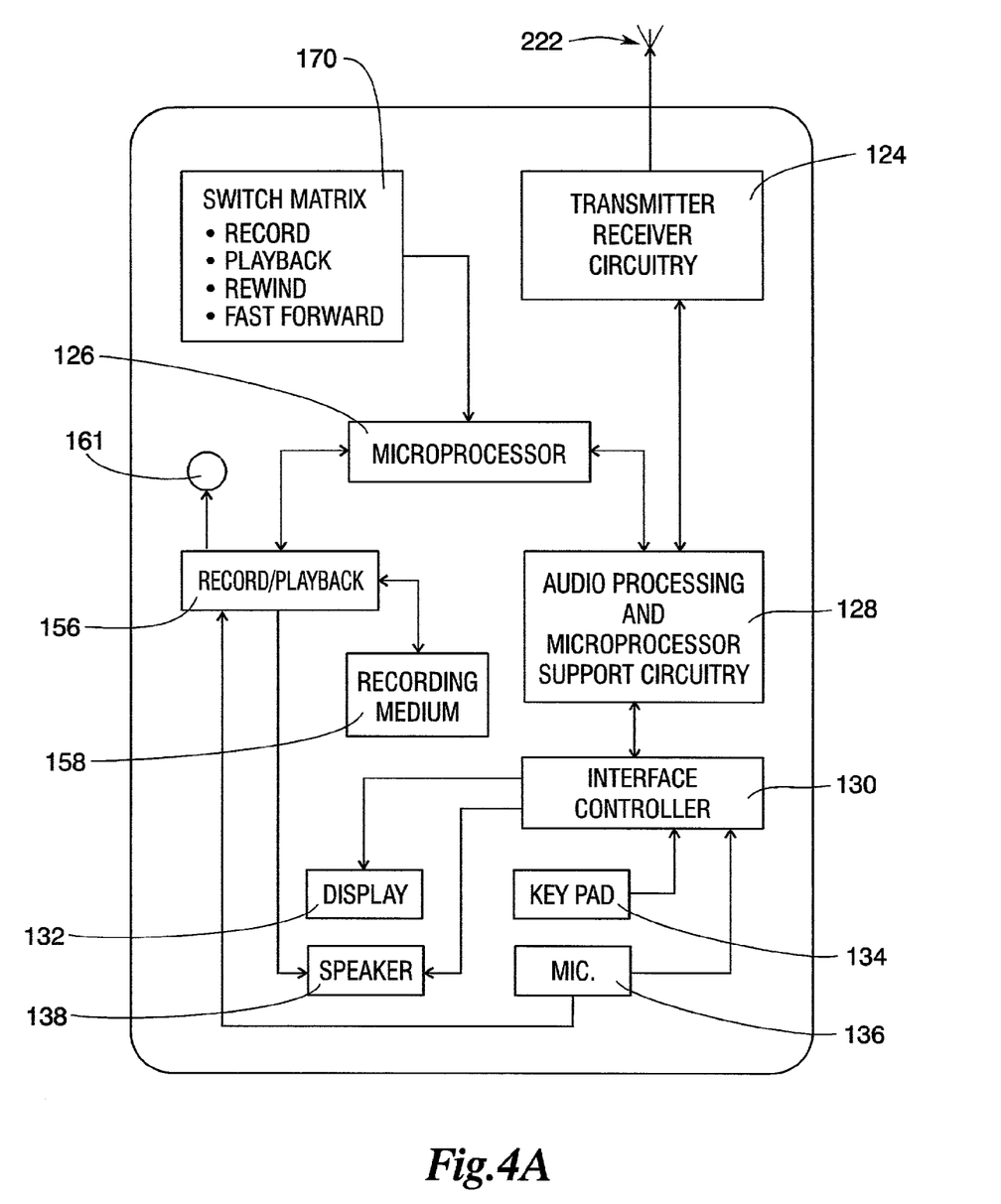
FIG. 4A is a partial schematic depicting certain components of another mobile communication device of the present invention.

A control circuit 160 may also be employed to exchange signals with the record/playback circuit 156. The control circuit 160 controls the record/playback circuit 156 of the recorder 150 in general. In this embodiment, the control circuit 160 may comprise a "second" microprocessor (not shown) or microcontroller (not shown) or, as shown in FIG. 4A, a common microprocessor 126 may be employed for operating the various components of the telephone 120 and the audio recorder 150 and may include program memory and working memory, which are not separately shown. In this embodiment, the recorder 150 may also include an LED 161 to indicate when the recorder is in the record mode.

Also in this embodiment, the recorder 150 may include at least one switch matrix 170 which enables the user to provide input to the control circuit 160. Such switch matrix may include one or more keys 172 for commencing and discontinuing various functions such as record, playback, rewind and fast forward functions. The skilled artisan will appreciate, however, that some of the above-mentioned keys 172 may be omitted or replaced with other keys. Furthermore, the keys 172 may each operate a respective switch that is movable between a first position (nonactuated) and a second position (actuated). In one embodiment, for example, some or all of the switches are biased toward the nonactuated position. In another embodiment, one or more of the switches may be actuated by a shared key configuration, such as a rocker switch. A variety of known switching arrangements and configurations may be employed. For example, one arrangement that may be employed requires the user to actively maintain the record switch in the activated position to record an audio message onto the recording medium. In another "record lock" mode, recording is carried out without the requiring the user to maintain the record switch in the activated position.

Figure 5:
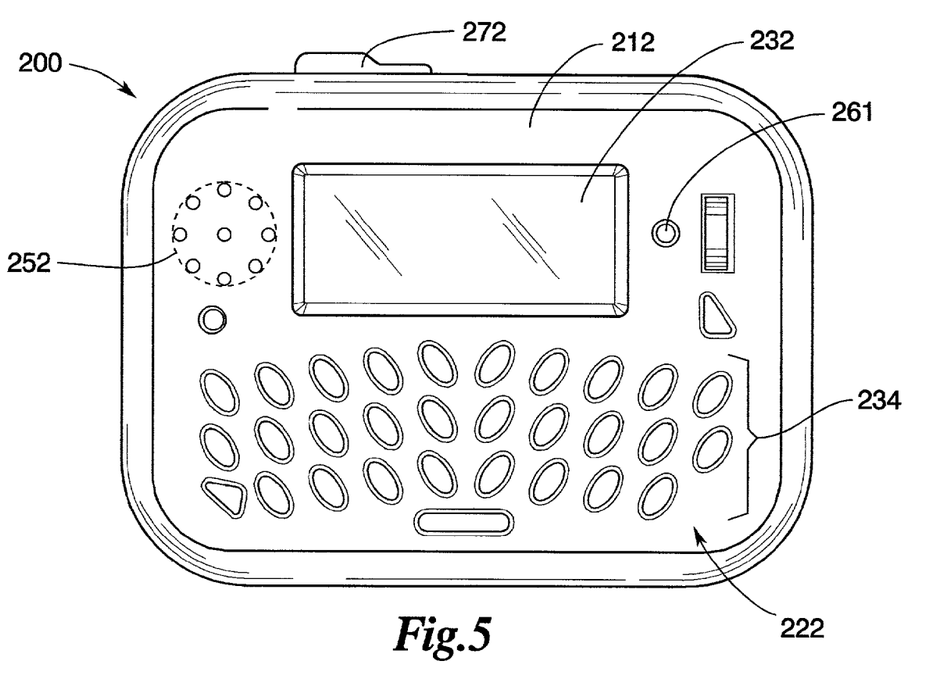
FIG. 5 is a front view of another embodiment of a mobile communication device of the present invention.
Figure 6:
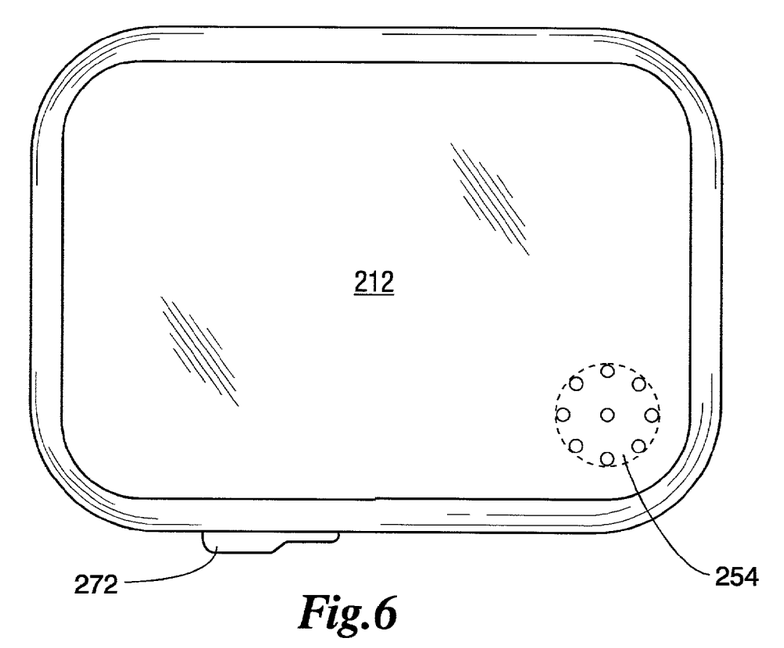
FIG. 6 is a rear view of the mobile communication device of FIG. 5.
Figure 7:
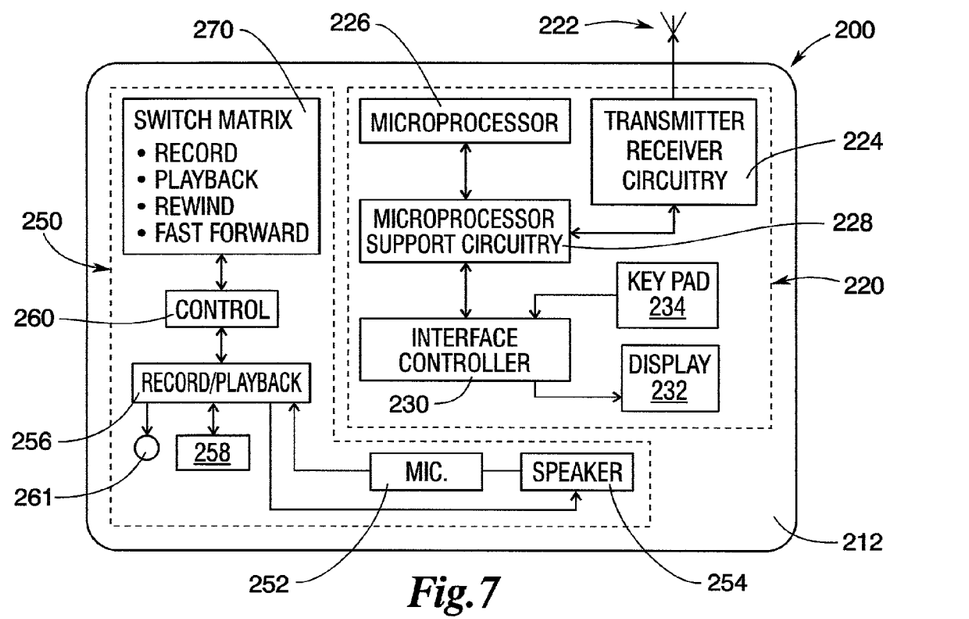
FIG. 7 is a partial schematic depicting certain components of the mobile communication device of FIGS. 5 and 6.

Another embodiment of the mobile communication device of the present invention is depicted in FIGS. 5–7. As can be seen in those Figures, the device 200 includes a wireless handheld device 220 and an audio recorder 250. Hand held devices such as RIM wireless hand held devices are known in the art and, therefore, their construction and operation will not be disclosed herein beyond what is necessary to understand and implement these embodiments of the subject invention. As can be seen in FIGS. 5–7, the device 200 includes a housing 212 that may support an antenna 222, transmitter receiver circuitry 224, a microprocessor 226, microprocessor support circuitry 228, an interface controller 230, a PDA display 232, a PDA key pad 234 and other conventional components. In the embodiment depicted in FIG. 7, the device 200 includes an audio recorder 250 that may be "self-contained" and include a microphone 252 and a speaker 254. A record/playback circuit 256 receives electrical sound signals generated at the microphone and records such signals on a recording medium 258. The recording medium 258 may comprise, for example, a conventional solid state memory card or magnetic tape cassette.

If digital recording is to be carried out in the recorder 256, the record/playback circuit 256 may include analog-to-digital conversion circuitry. If that is the case, the record/playback circuit 256 may include data compression/decompression circuitry. The record/playback circuit 256 may serve to reproduce a stored sound signal from the recording medium 258 and to process the reproduced signal to provide an output signal to the speaker 254.

Figure 7A:
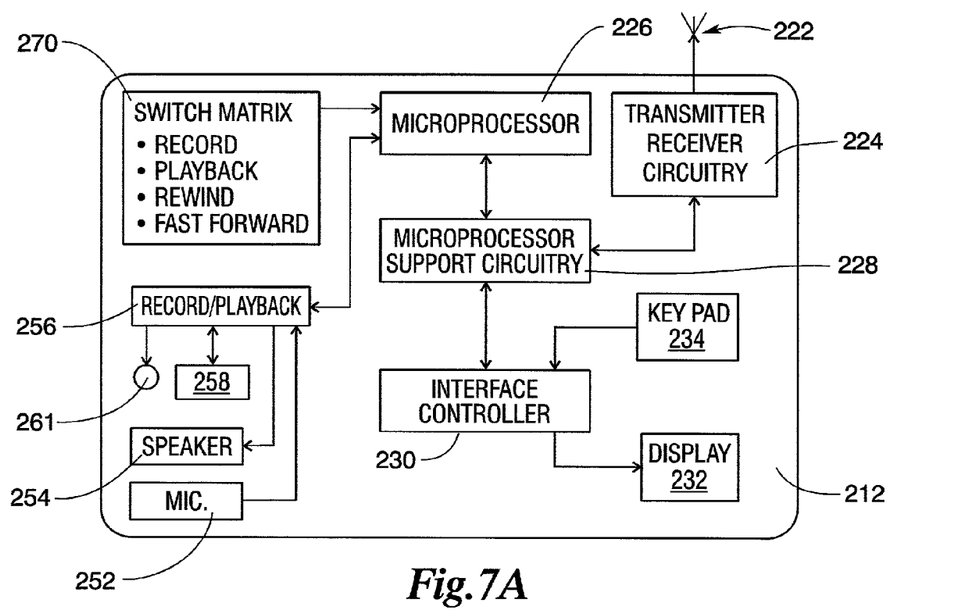
FIG. 7A is a partial schematic depicting certain components of another mobile communication device of the present invention.

A control circuit 260 may be employed to exchange signals with the record/playback circuit 256. The control circuit 260 may control the record/playback circuit 256 of the recorder 250 in general. In this embodiment, the control circuit 260 may comprise a microprocessor (not shown) or microcontroller (not shown). It will be understood that such controller device may include program memory and working memory, which are not separately shown. In the embodiment of FIG. 7A, the recorder 250 and the PDA device 220 employ a common microprocessor 226. In these embodiments, the recorder 250 may also include an LED 261 to indicate when the recorder is in the record mode.

In this embodiment, the recorder 250 may also include at least one switch matrix 270 which enables the user to provide input to the control circuit 260. Such switch matrix may include one or more keys 272 for commencing and discontinuing various functions such as record, playback, rewind and fast forward functions. The skilled artisan will appreciate, however, that some of the above-mentioned keys may be omitted or replaced with other keys. Furthermore, the keys 272 may each operate a respective switch which is movable between a first position (nonactuated) and a second position (actuated). In one embodiment, for example, some or all of the switches 270 are biased toward the nonactuated position. In another embodiment, one or more of the switches 270 may be actuated by a shared key configuration, such as a rocker switch. A variety of known switching arrangements and configurations may be employed. For example, one arrangement that may be employed requires the user to actively maintain the record switch in the activated position to record an audio message on to the recording medium. In another "record lock" mode, recording is carried out without requiring the user to maintain the record switch in the activated position.

Those of ordinary skill in the art will understand that the device 200 also includes other components not specifically shown, such as a power manager which controls the supply of power and ground potential to the various components and circuits of the of the PDA and the audio recorder such that separate types of power and grounding may be available for digital circuits, analog and audio circuits, and RF circuits. A rechargeable battery (not shown) may be included in the device which supplies portable power to the PDA 220 and the audio recorder 250 and is rechargeable through a known charge control circuit. In addition, a charging connector may also be included for receiving charging current from a charging accessory, such as, for example, a wall or table mounted transformer.

Those of ordinary skill in the art will appreciate that the above-described device could comprise a one-way or two-way conventional pager with an audio recorder therein. Thus, the present invention should not be limited to wireless or cellular communication devices and PDA devices specifically disclosed herein.

Thus, from the foregoing discussion, it is apparent that the various embodiments of the present invention provide the user with the unique and novel ability to record and playback audio messages utilizing anyone of the above-mentioned communication devices without having to carry a separate devices. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. A mobile communication device, comprising:
    a housing;
    a mobile telephone operably supported by said housing; and a self-contained audio recorder operably supported by said housing,
    wherein said mobile telephone comprises:
        a first microprocessor supported by said housing;
        microprocessor support circuitry configured to communicate with said first microprocessor;
        an interface controller operably connected to said microprocessor support circuitry;
        a display screen configured to communicate with said interface controller;
        a keypad operably connected to said interface controller;
        a first speaker coupled to the mobile telephone;
        transmitter receiver circuitry operably connected to said audio processing and operably connected to said microprocessor support circuitry; and
        an antenna communicating with said transmitter receiver circuitry,
    wherein said self-contained audio recorder comprises:
        a second microprocessor supported by said housing;
        an input device configured to communicate with said second microprocessor;
        record and playback circuitry coupled to said second microprocessor for recording a signal on a recording medium;
        a first microphone configured to communicate with said second microprocessor through said record and playback circuitry; and
        a second speaker configured to communicate with said second microprocessor through said record and playback circuitry,
        wherein the first speaker is different than the second speaker.

2. The mobile communication device of claim 1, further comprising an LED communicating with said second microprocessor.

3. The mobile communication device of claim 1, further comprising a program memory.

4. The mobile communication device of claim 1, further comprising a working memory.

5. The mobile communication device of claim 4, further comprising a program memory, wherein the program memory is different than the working memory.

6. The mobile communication device of claim 1, wherein the self-contained audio recorder further comprises analog to digital circuitry.

7. The mobile communication device of claim 1, wherein the self-contained audio recorder further comprises compression/decompression circuitry.

8. A mobile communication device, comprising:
a housing;
a mobile telephone operably supported by said housing; and a self-contained audio recorder operably supported by said housing,
wherein said mobile telephone comprises:
a first microprocessor supported by said housing;
microprocessor support circuitry configured to communicate with said first microprocessor;
an interface controller operably connected to said microprocessor support circuitry;
a display screen configured to communicate with said interface controller;
a keypad operably connected to said interface controller;
a first microphone coupled to the mobile telephone;
transmitter receiver circuitry operably connected to said audio processing and operably connected to said microprocessor support circuitry; and
an antenna communicating with said transmitter receiver circuitry,
wherein said self-contained audio recorder comprises:
a second microprocessor supported by said housing;
an input device configured to communicate with said second microprocessor;
record and playback circuitry coupled to said second microprocessor for recording a signal on a recording medium;
a second microphone configured to communicate with said second microprocessor through said record and playback circuitry; and a first speaker configured to communicate with said second microprocessor through said record and playback circuitry,
wherein the first microphone is different than the second microphone.

9. The mobile communication device of claim 8, further comprising an LED communicating with said second microprocessor.

10. The mobile communication device of claim 8, further comprising a program memory.

11. The mobile communication device of claim 8, further comprising a working memory.

12. The mobile communication device of claim 11, further comprising a program memory, wherein the program memory is different than the working memory.

13. The mobile communication device of claim 8, wherein the self-contained audio recorder further comprises analog to digital circuitry.

14. The mobile communication device of claim 8, wherein the self-contained audio recorder further comprises compression/decompression circuitry.

15. A mobile device, comprising:
a microprocessor operably supported by a housing;
a mobile communications device operably supported by said housing, the mobile communications device comprising:
microprocessor support circuitry configured to communicate with said microprocessor;
an interface controller operably connected to said microprocessor support circuitry; and
a first microphone operably connected to said microprocessor, said first microphone configured to facilitate audio communication; and
a self-contained audio recorder operably supported by said housing, comprising:
an input device configured to communicate with said microprocessor;
record and playback circuitry coupled to said microprocessor for recording a signal on a recording medium;
a second microphone configured to communicate with said microprocessor via said record and playback circuitry, wherein said second microphone is different than said first microphone; and
a first speaker configured to communicate with said microprocessor through said record and playback circuitry,
wherein said mobile communications device further comprises a second speaker coupled to said mobile communications device, said second speaker being configured to communicate with said microprocessor, wherein said second speaker is different than said first speaker.

16. The mobile device of claim 15, wherein said mobile communications device includes at least one of the following: a mobile telephone, a mobile pager, and a Personal Digital Assistant (PDA).

* * * * *